（12） United States Patent
Mejjati et al.

(10) Patent No.: US 11,138,693 B2
(45) Date of Patent: Oct. 5, 2021

(54) ATTENTION-DRIVEN IMAGE MANIPULATION

(71) Applicant: Adobe Inc., San Jose, CA (US)

(72) Inventors: Youssef Alami Mejjati, Bath (GB); Zoya Bylinskii, Cambridge, MA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 21 days.

(21) Appl. No.: 16/752,030

(22) Filed: Jan. 24, 2020

(65) Prior Publication Data

US 2021/0233213 A1 Jul. 29, 2021

(51) Int. Cl.
*G06T 5/00* (2006.01)
*G06T 7/194* (2017.01)

(52) U.S. Cl.
CPC ............ *G06T 5/001* (2013.01); *G06T 7/194* (2017.01); *G06T 2200/24* (2013.01); *G06T 2207/20081* (2013.01); *G06T 2207/20084* (2013.01); *G06T 2207/20092* (2013.01)

(58) Field of Classification Search
CPC ..... G06T 5/001; G06T 7/194; G06T 2200/24; G06T 2207/20084; G06T 2207/20092; G06T 2207/20081
See application file for complete search history.

(56) References Cited

U.S. PATENT DOCUMENTS

| 2014/0063275 | A1* | 3/2014 | Krahenbuhl | H04N 19/117 348/208.4 |
| 2016/0163058 | A1* | 6/2016 | Wei | G06T 7/194 382/171 |
| 2017/0372162 | A1* | 12/2017 | Wang | G06K 9/00664 |
| 2019/0311202 | A1* | 10/2019 | Lee | G06K 9/6256 |
| 2020/0320401 | A1* | 10/2020 | Jampani | G06N 3/0454 |

OTHER PUBLICATIONS

D1: Roey et al. ("Saliency Drivnen Image Manipulation", arXlv:1612.02141v3, Jan. 17, 2018, 9 pages) (Year: 2018).*

(Continued)

*Primary Examiner* — Ping Y Hsieh
(74) *Attorney, Agent, or Firm* — F. Chau & Associates, LLC

(57) ABSTRACT

Techniques of adjusting the salience of an image include generating values of photographic development parameters for a foreground and background of an image to adjust the salience of the image in the foreground. These parameters are global in nature over the image rather than local. Moreover, the optimization of the salience over such sets of global parameters is provided through two sets of these parameters by an encoder: one set corresponding to the foreground, in which the salience is to be either increased or decreased, and the other set corresponding to the background. Once the set of development parameters corresponding to the foreground region and the set of development parameters corresponding to the background region have been determined, a decoder generates an adjusted image with an increased salience based on these sets of development parameters.

20 Claims, 9 Drawing Sheets

(56) References Cited

OTHER PUBLICATIONS

Barnes, Connelly, et al., "Patchmatch: A Randomized Correspondence Algorithm for Structural Image Editing", ACM Transactions on Graphics (ToG). vol. 28. No. 3. ACM, 2009, 10 pages.
Gatys, Leon A., et al., "Guiding Human Gaze With Convolutional, Neural Networks", arXiv:1712.06492v1 Dec. 18, 2017, 12 pages.
Hu, Yuanming, et al., "Exposure: A white-box photo post-processing framework", arXiv:1709.09602v2, Feb. 6, 2018, 23 pages.
Johnson, Justin, et al., "Perceptual losses for real-time style transfer and super-resolution", arXiv:160308155v1, Mar. 27, 2016, 18 pages.
Mechrez, Roey, et al., "Saliency Driven Image Manipulation", arXlv:1612.02184v3, Jan. 17, 2018, 9 pages.

\* cited by examiner

ATTENTION-DRIVEN IMAGE MANIPULATION

TECHNICAL FIELD

This description relates to image editing, specifically increasing or decreasing image salience over a specified image region.

BACKGROUND

A saliency map of a first set of pixels is a second set of pixels that shows a specific quantity indicative of a likelihood of drawing a viewer's attention for each pixel of the first set of pixels. For example, a saliency map can measure the ability of a set of pixels corresponding to an object to capture the attention of a viewer.

Conventional approaches to adjusting images to increase a salience of selected objects of the images include manually adjusting the brightness or color of at least a subset of pixels of an image. For example, consider a designer of an advertisement who has an image containing an object that is the subject of the advertisement. The designer may use image processing software to increase the saliency of the pixels defining an object to which the designer wants to draw attention and decrease the saliency of all other pixels of the image. One way the designer may accomplish this is to increase the brightness of the pixels making up the object and decrease the brightness of other pixels. Another way to accomplish this adjustment is to adjust the intensity of, say, a red color channel in the pixels making up the object while decreasing the intensity of the red color channel in other pixels. In some implementations, the designer may wish to create the opposite effect when the designer wants to draw attention away from, i.e., decrease the saliency of the pixels making up the object and increase the saliency of all other pixels of the image.

Such conventional approaches to adjusting a salience of selected objects of the images involving manual adjustment of pixels of an image are time-consuming, burdensome, and susceptible to error. In contrast, other conventional approaches include automated adjustments to the saliency map of an image. For example, one conventional approach includes using a generative adversarial network (GAN) with an encoder-decoder based generator taking an entire image and a target saliency map as input. Such an approach, however, may allow excessive freedom for the generator and may result in artifacts reducing the realism of the generated images. Another downside of this approach is that it requires the target saliency map as input, i.e., the user must specify how the saliency on the final, edited image should be distributed. This downside makes the approach impractical when a target saliency map is unavailable.

Another conventional approach to adjusting a salience of selected objects of the images includes a patch synthesis algorithm. Such a patch synthesis approach identifies a set of patches (e.g., regions) of an image having a desired saliency and performs a patch synthesis operation on a given saliency map (i.e., a set of search operations on the saliency map) to produce a set of operations on specified color or texture parameters that produce the desired salience over the identified set of patches in the image. This approach requires a separate optimization for each image, consuming a significant amount of time and making it infeasible for interactive applications, high-resolution images, or videos.

SUMMARY

In one general aspect, a method can include receiving (i) initial image data representing an initial image having a plurality of pixels and (ii) object mask data indicating a foreground region of the plurality of pixels and a background region of the plurality of pixels. The method can also include generating, based on the initial image data and the object mask data, (i) values of a set of foreground image development parameters corresponding to the foreground region and (ii) values of a set of background image development parameters corresponding to the background region. The method can further include generating, based on the initial image data, the foreground image parameter values, and the background image parameter values, adjusted image data representing an adjusted image, the adjusted image having increased or decreased salience values in the foreground region. The method can further include displaying the adjusted image on a display device.

Some photographers may edit their photos to make an object or a person more attention-capturing or to downplay distracting background elements or clutter. Further, such a photographer may desire an automated approach to highlight the main subject of a photo or to reduce the saliency of particular elements in the photo (e.g., tourists). For example, in advertising and marketing applications, a product may need to be edited in an image to draw more attention to it.

The details of one or more implementations are set forth in the accompa-nying drawings and the description below. Other features will be apparent from the description and drawings, and from the claims.

DETAILED DESCRIPTION

Figure 1:
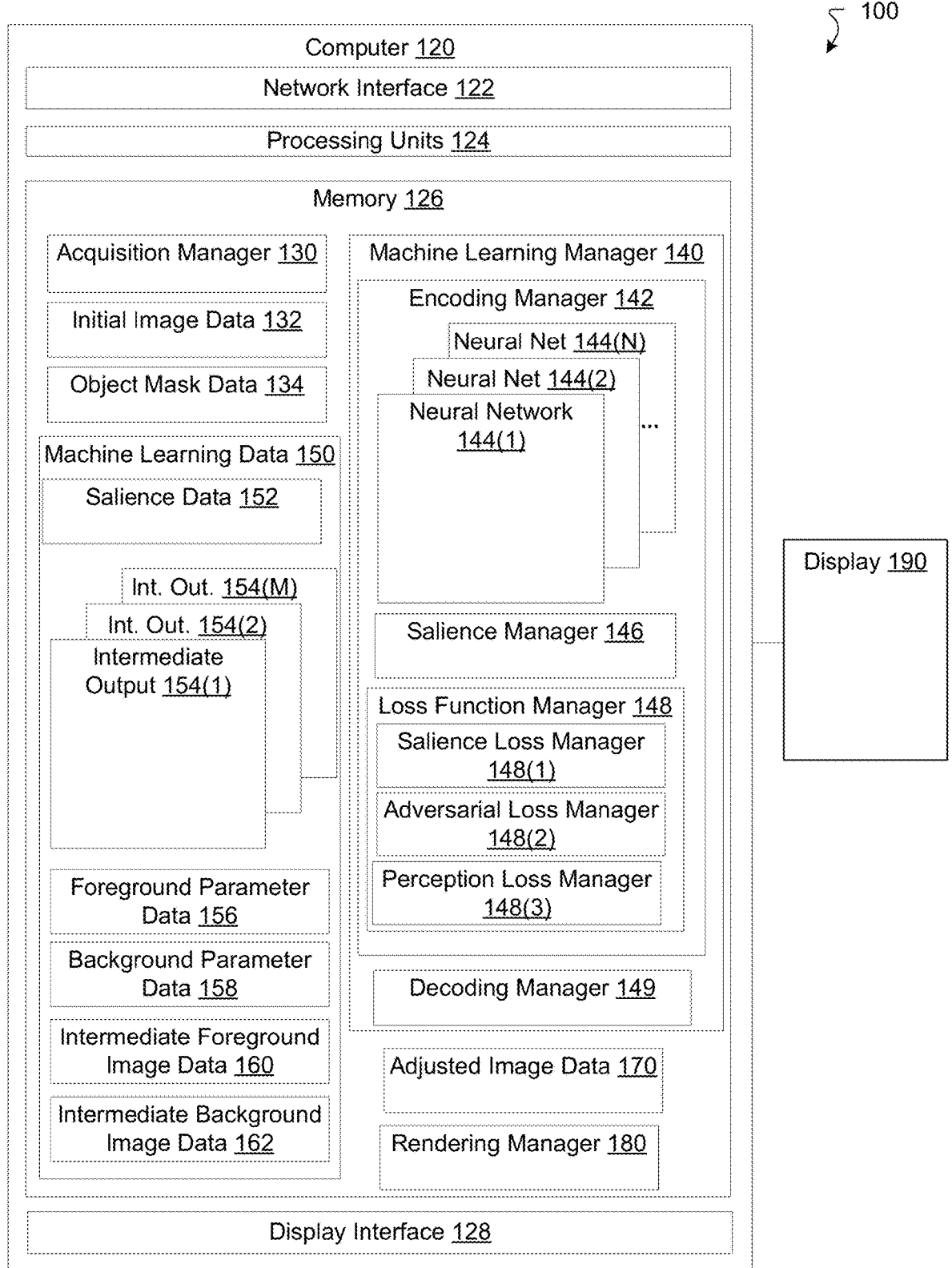
FIG. 1 is a diagram illustrating an example electronic environment in which improved techniques described herein may be implemented.

In contrast to the above-described conventional approaches to adjusting a saliency of specified objects of images, disclosed herein is an improved technique including an automatic approach, using a deep neural network that, based on an image and object mask input from a user, predicts a set of global parametric image edits that can be used to adjust saliency of the image. Here, the image edits are predicted separately for the masked object (e.g., foreground) and the rest of the image (e.g., background). Unlike existing saliency adjustment solutions, which can result in unwanted artifacts, the improved techniques produce salience adjustments to the images that not only lack such artifacts but result in features that are more subtle and realistic than those produced using the conventional approaches. Accordingly, the improved technique described herein is a more accurate and efficient approach to improving saliency of an image.

Examples of such global parametric image edits include changes to brightness, contrast, exposure, saturation, white balance, sharpening, blur, and tone and color curve adjustments. These parameters, unlike those manipulated in the above-described conventional approaches, are global in nature over the image rather than local. Moreover, the optimization of the salience over such sets of global parameters is provided through two sets of these parameters by an encoder: one set corresponding to the foreground, in which the salience is to be either increased or decreased, and the other set corresponding to the background. Once the set of development parameters corresponding to the foreground region and the set of development parameters corresponding to the background region have been determined, a decoder generates an adjusted image with an optimized salience based on these sets of development parameters. Using such global parametric image edits, rather than local changes to each pixel, improves encoder accuracy and decoder speed.

The above-described improved techniques of adjusting the salience of an image allows one to optimally increase or decrease the salience of specified objects in an image without requiring a target saliency map. Such optimization is possible because the optimization is over global development parameters of the image, separately for the foreground region and the background region.

Moreover, the adjustments to the image according to the improved techniques are constrained to be subtle and make the adjusted image appear realistic. Such realism is achieved with a novel loss function in the encoder having a salience component and an adversarial component. The salience component represents a difference in saliency between the foreground region of the adjusted image and the initial image. The adversarial component represents a likelihood that the adjusted image data is recognizable as a real image to a viewer and includes, in some implementations, a GAN loss to ensure a degree of realism. In some implementations, to ensure that the modified image is perceptually similar to the input image, the loss function further has a perceptual loss component, the perceptual loss component being based on a difference between feature representations extracted from the initial image and the adjusted image and ensuring that the adjusted image does not deviate excessively from the initial (original) image.

In some implementations, the encoder includes a plurality of (trainable) neural networks. In some implementations, each of the plurality of neural networks includes a convolutional neural network (CNN). In some implementations, a first neural network is configured to output the foreground image parameter values and the background image parameter values based on an image and an object mask that delineates between a foreground region of the image and the background region of the image. In some implementations, a second neural network is configured to produce a first output indicative of semantic content of the initial image. In some implementations, the semantic content includes a representation of features (e.g., objects) of the image. In some implementations, the encoder is configured to generate an initial saliency map based on the initial image. In some implementations, the first neural network is configured to produce, from a combination of the first output and the second output the foreground image parameter values and the background image parameter values. In some implementations, the combination of the first output and the second output includes concatenating the first output and the second output.

In some implementations, the decoder includes a fixed set of functions, each of the fixed (i.e., not trainable) set of functions being applied separately to the foreground image parameter values and the background image parameter values to produce the adjusted image values. In some implementations, the set of functions include a sequence of differentiable functions from which pairs of intermediate foreground and background images are generated by applying the set of foreground image development parameters to an intermediate foreground image using the object mask and the set of background image development parameters to an intermediate background image using a complement of the object mask. Pairs of intermediate foreground and background images are generated in sequence until a final pair is generated. Once the final pair is generated, the final, adjusted image is a blend of the final foreground image and the final background image.

The encoder may be configured, in some implementations, to allow a user to select the image development parameters over which the encoder optimizes the loss function and hence the image salience in the foreground region. For example, a user may only care about gamma correction exposure, contrast, and blur, and not wish to optimize over any other parameters. In some implementations, ranges of such parameter values are represented in image processing software as sliders in a graphical user interface (GUI).

The encoder may be configured, in some implementations, to adopt different styles corresponding to different users. For example, one user may prefer a dark background while another user may prefer a blurred background. Such styles may be integrated into the encoder via a multi-layer perceptron (MLP) that is trained using randomly sampled vectors that correlate with the adjusted image.

The value of performing according to the improved techniques lies in the prediction of the two sets of image development parameters via the encoder. This improved technique of adjusting image salience can be effective in cluttered scenes, where multiple regions in the initial image have high salience. In this case, reducing the salience of the background region may be easier than increasing the salience of the foreground region. Foreground image development parameters are image development parameters that are global in nature (i.e., they dictate changes across all pixels in an image) but correspond to the foreground region. Background image development parameters are image development parameters correspond to the background region.

As used herein, image data represents an image of a scene containing objects, or features, to which or from which a viewer's attention may be drawn. Object mask data represents a demarcation of the image into a foreground region and a background region. A foreground region of an image is a region of the image that contains objects or features to which or from which a viewer's attention may be drawn. A background region of an image is the region of the image outside of the foreground region of the image. Note that the foreground region and/or the background region of an image need not be contiguous or define a simply connected set of points.

FIG. 1 is a diagram that illustrates an example electronic environment 100 in which the above-described improved techniques may be implemented. As shown, in FIG. 1, the electronic environment 100 includes a computer 120 and a display 190.

The computer 120 is configured to display user-specified drawings on a display device. The computer 120 includes a network interface 122, one or more processing units 124, memory 126, and a display interface 128. The network interface 122 includes, for example, Ethernet adaptors, wireless adaptors, and the like, for converting electronic and/or optical signals received from a network to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include an acquisition manager 130, a machine learning manager 140 which includes an encoding manager 142, a salience manager 146, a loss function manager 148, a decoding manager 149, and a rendering manager 180. Further, as illustrated in FIG. 1, the memory 126 is configured to store various data, which is described with respect to the respective managers that use such data.

The acquisition manager 130 is configured to obtain initial image data 132 representing an image that may be displayed on the display device 190. The acquisition manager 130 is also configured to obtain object mask data 134 representing a demarcation of the image into a foreground region and a background region. In some implementations, the acquisition manager 130 is configured to receive the initial image data 132 and the object mask data 134 over a network via the network interface 122. In some implementations, the acquisition manager 130 is configured to receive the initial image data 132 and the object mask data 134 via local storage (e.g., memory 126).

The initial image data 132 represents an image that may be rendered (e.g., by the rendering manager 180) onto a display (e.g., display 190) for viewing by a user. The initial image data 132 further represents an image of a scene containing objects. The image represented by the initial image data 132 has multiple pixels (e.g., 1920 X 1080), such that each pixel includes an image value (e.g., grayscale value, RGB value).

The object mask data 134, as mentioned above, represents a demarcation of the image into a foreground region and a background region. In some implementations, the foreground region includes a set of pixels that define the area of the image to which a viewer's attention is to be drawn. In some implementations, the foreground region includes a set of pixels that define the area of the image from which a viewer's attention is to be diverted. The background region includes the remaining pixels.

The machine learning manager 140 is configured to perform machine learning operations on the initial mask data 132 and the object mask data 134 to produce machine learning data 142 that includes foreground parameter data 156 and background parameter data 158 representing values of foreground and background image development parameters that optimize the salience of the image over the foreground region. The machine learning manager 140 includes an encoding manager 142 and a decoding manager 149.

The encoding manager 142 is configured to generate the foreground parameter data 156 and background parameter data 158 representing values of foreground and background image development parameters that optimize the salience of the image over the foreground region. As shown in FIG. 1, the encoding manager includes a plurality of neural networks 144(1), 144(2), . . . , 144(N), a salience manager 146, and a loss function manager 148.

Each of the plurality of neural networks 144(1), 144(2), . . . , 144(N) is configured to identify sematic content of the image, constrain the adjustments to the image so that the adjustments are subtle to the viewer, and draw viewer attention to (or away from) the foreground region. In some implementations, some or all of the plurality of neural networks 144(1), 144(2), . . . , 144(N) is a CNN. In some implementations, at least one of the neural networks, 144(1), is a pre-trained VGG16 network for extracting image features. In some implementations, the neural network 144(1) is a network with different feature extractors pre-trained using ImageNet data (e.g., VGG19, ResNet, and the like). In some implementations, at least one of the neural networks, 144(2), is an encoding network configured to encode the object mask data 134 and a saliency map, e.g., salience data 152, generated by the salience manager 146 from the initial image data 132. In some implementations, at least one of the neural networks, 144(3), includes fully connected network configured to predict image development parameter values from intermediate output, e.g., intermediate output 154(1).

In some implementations, the encoding manager 142 is configured to combine intermediate outputs, e.g., 154(3) and 154(4), using concatenation, addition, and the like. In some implementations, the encoding manager 142 is configured to perform a global average pooling operation on an intermediate output, e.g., 154(3) to provide global information about the image and saliency map which are useful when predicting global parametric transformations.

The loss function manager 148 is configured to generate loss function values based on the initial image data 132 and adjusted image data 170. The loss function is configured to optimize the salience of the adjusted image in the foreground region while maintaining a realism of the adjusted image and the features of the original image. To this effect, the loss function manager 148 includes a salience loss manager 148(1), an adversarial loss manager 148(2), and a perceptual loss manager 148(3). The salience loss manager 148(1) represents a salience loss component of the loss function and is configured to reduce a salience loss over the foreground region. The adversarial loss manager 148(2) represents a critic, e.g., a hinge-GAN-based loss configured to differentiate between real and generated images. The perceptual loss manager 148(3) represents pairwise differences between features of the initial and adjusted images extracted from a pre-trained VGG16 network and is configured to keep the adjusted image close in content to the initial image.

The decoding manager 149 is configured to generate intermediate foreground image data 160 and intermediate background image data 162 from the foreground parameter data 156 and the background parameter data 158 produced by the encoding manager 142. The decoding manager 149 is also configured to generate the adjusted image data 170 from iterated sequences of intermediate foreground image data 160 and intermediate background image data 162.

The rendering manager 180 is configured to render the adjusted image data 170 to display the adjusted image data 170 on the display 190. In some implementations, when the adjusted image data 170 is encoded (e.g., with a JPEG codec), the rendering manager 180 decodes the encoded data.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, an acquisition manager 130 (and/or a portion thereof), a machine learning manager 140 (and/or a portion thereof), and a rendering manager 180 (and/or a portion thereof can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including initial image data 132, the object mask data 134, machine learning data 150, and the adjusted image data 170.

Figure 2:
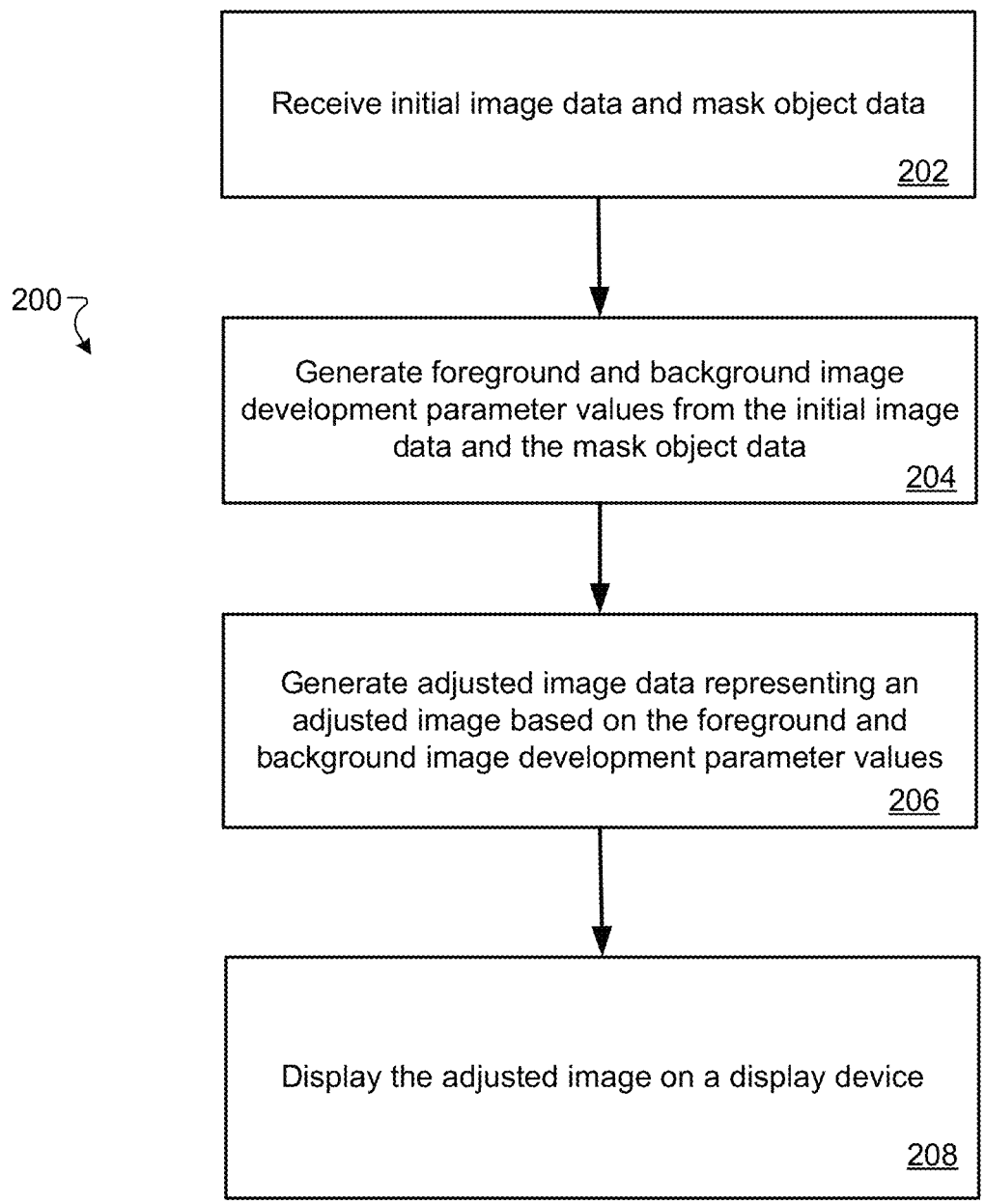
FIG. 2 is a flow chart illustrating an example method of implementing the improved techniques as shown in the electronic environment in FIG. 1.

FIG. 2 is a flow chart depicting an example method 200 of adjusting the image salience of an image. The method 200 may be performed by software constructs described in connection with FIG. 1, which reside in memory 126 of the computer 120 and are run by the set of processing units 124.

At 202, the acquisition manager 130 receives (i) initial image data (e.g., initial image data 132) representing an initial image over a plurality of pixels and (ii) object mask data (e.g., object mask data 134) indicating a foreground region of the plurality of pixels and a background region of the plurality of pixels.

At 204, the encoding manager 142 generates, based on the initial image data and the object mask data, (i) values of a set of foreground image development parameters (e.g., foreground parameter data 156) corresponding to the foreground region and (ii) values of a set of background image development parameters (e.g., background parameter data 158) corresponding to the background region, the background image parameter values being different from the foreground image parameter values.

At 206, the decoding manager 149 generates, based on the initial image data, the foreground image parameter values, and the background image parameter values, adjusted image data (e.g., adjusted image data 170) representing an adjusted image, the adjusted image having increased (or decreased) salience values over the foreground region.

At 208, the rendering manager 180 displays the adjusted image on a display device (e.g., display device 190).

Figure 3:
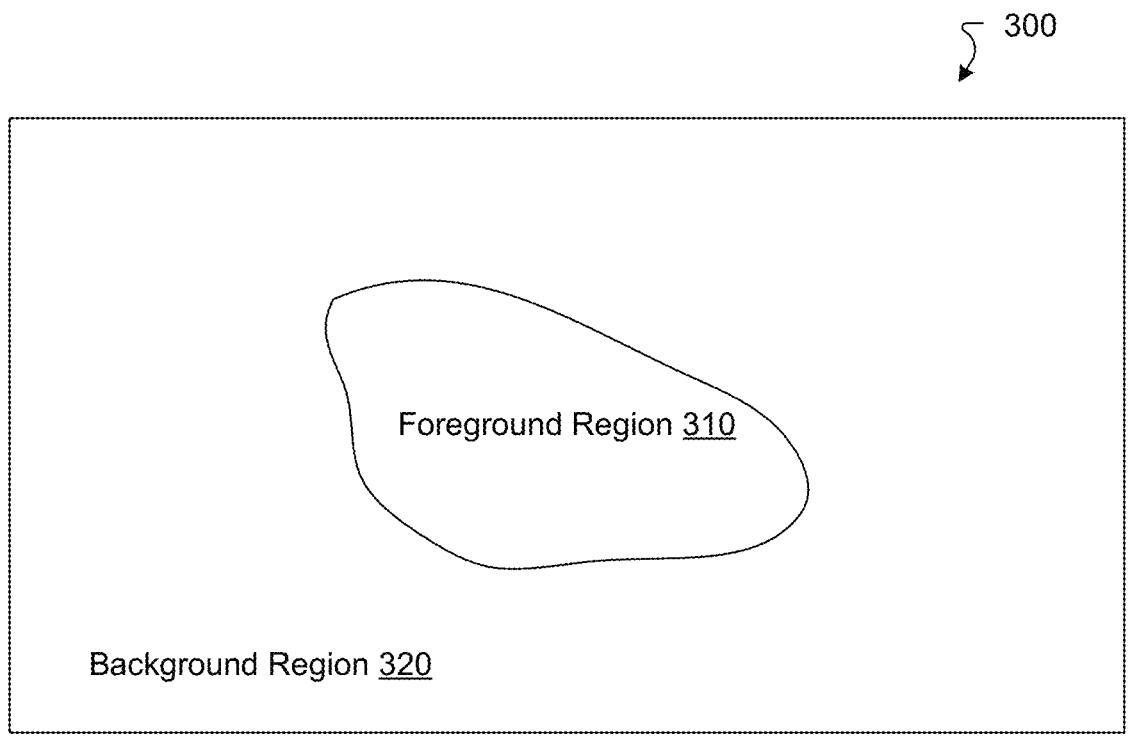
FIG. 3 is a diagram illustrating an example object mask defining a foreground region and a background region.

FIG. 3 is a diagram illustrating an example object mask 300 (represented by object mask data 134) defining a foreground region 310 and a background region 320 of an image. As discussed above with regard to FIGS. 1 and 2, the encoder 142 is configured to optimize image development parameter values separately for the foreground region 310 and the background region 320 for an image as defined by the object mask 300.

In some implementations, the object mask 300 is generated manually, i.e., by selecting, as the foreground region 310, a region of an image containing an object of interest. In some implementations, the object mask 300 is generated automatically based on, e.g., pattern recognition, computer vision, and the like applied to an object of interest in the image.

In some implementations, the object mask 300 includes a binary array. In some implementations, the binary array has values of one for pixels inside the foreground region 310 and zero for pixels inside the background region 320. The object masks discussed here are not limited to these values and can take on any values such that there is a specified difference between the foreground region 310 and the background region 320. In some implementations, the binary arrays are blurred at training and at testing to allow for a smooth transition between the foreground region 310 and the background region 320 in the final, adjusted image.

Given inputs I and a binary object mask m, the objective is to generate an adjusted image I' that redirects viewer attention toward the image area indicated by the binary object mask m. Herein, viewer attention is represented by a deep attention model S. The adjusted image I' is generated by sequentially applying a set of image development parameters traditionally used in photography science, e.g., photo editing software and computational photography. In some implementations, the sequence of parameters, in order of application, are gamma correction, sharpening, white balance, exposure, contrast, saturation, tone adjustment, color adjustment, and Gaussian blur. This is one example of a sequence of parameters and other sequences may be possible.

Figure 4A:
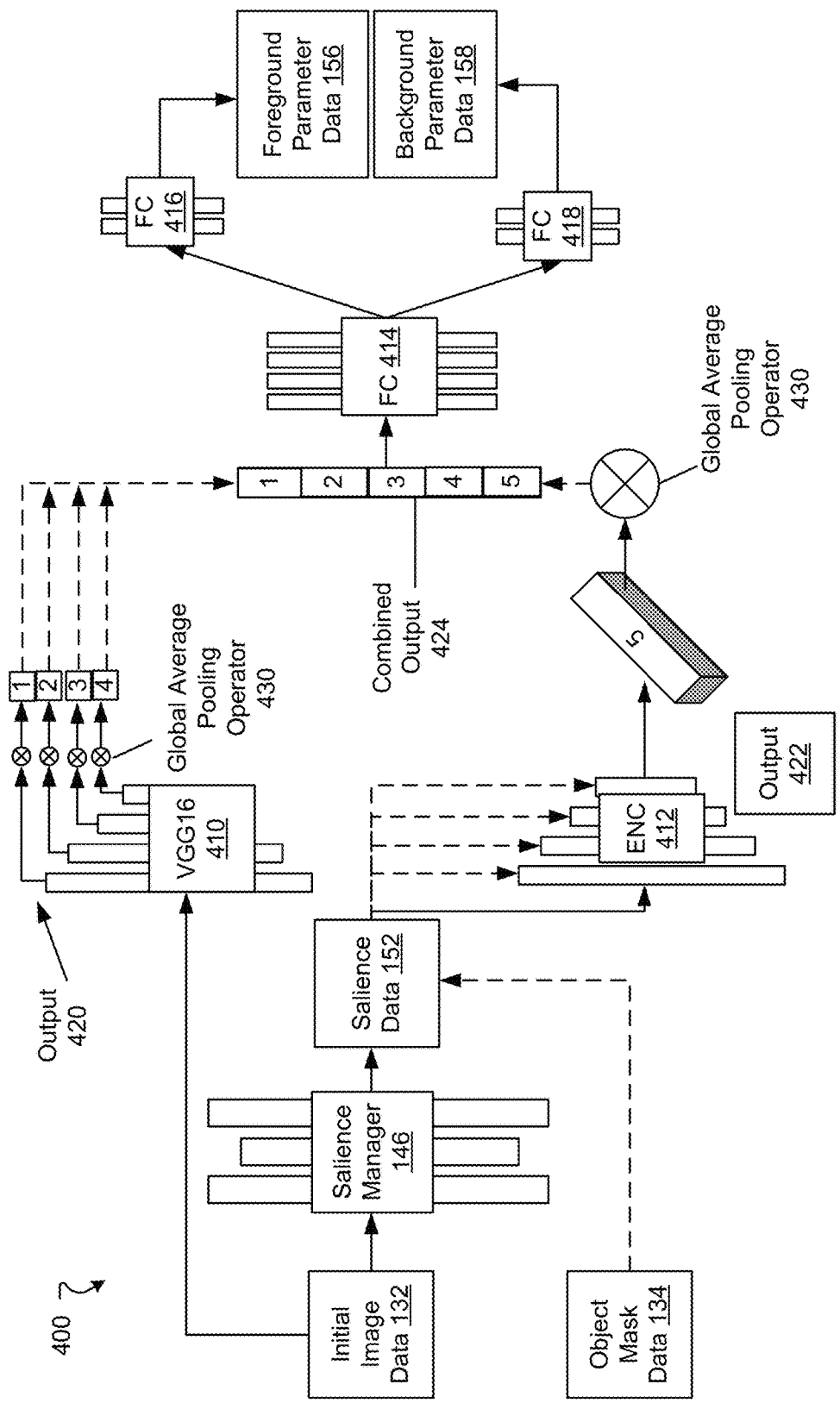
FIG. 4A is a diagram illustrating an example architecture of a convolutional neural network (CNN)-based encoder.

FIG. 4A is a diagram illustrating an example architecture of a convolutional neural network (CNN)-based encoder 400 (denoted by $G_E$) that produces, as output, the foreground parameter data 156 and the background parameter data 158; these in turn will serve as input into a decoder that is configured to generate the adjusted image data 170. The encoder 400 includes three CNNs, each of which is trained and configured to produce an output from a specified input. As shown in FIG. 4A, the encoder 400 includes a VGG16 network 410, an encoding convolutional neural network 412, and fully connected layers 414 that include a pair of smaller fully-connected heads 416 and 418. It should be understood that the encoder 400 may contain any number of neural networks of any kind; the architecture shown in FIG. 4A is only one example. In some implementations, the neural network 410 is a network with different feature extractors pre-trained using ImageNet data (e.g., VGG19, ResNet, and the like.

FIG. 4A also illustrates a flow of data through the encoder 400. Solid flow lines represent a data flow between operations, and dashed flow lines represent concatenation of data arrays.

The data flow through the encoder 400 begins with the input initial image data 132 and the object mask data 134 as described above. The encoder 400 inputs the initial image data 132 into the VGG16 network 410. The VGG16 network 410, upon receiving the initial image data 132 in its input layer, extracts features of the initial image represented by the initial image data 132 from each convolutional layer of the VGG16 network 410. In this way, the VGG16 network 410 captures semantic content of the initial image to produce output 420. In some implementations, the output 420 includes a vector of a specified size (e.g., 920). In some implementations, the features extracted from each layer of the VGG16 network 410 are of different sizes. In some implementations, the size of an extracted feature is given by $BH^{(i)}W^{(i)}C^{(i)}$, where B is a batch size, $H^{(i)}$ and $W^{(i)}$ are the height and width of the feature as represented in layer i, and $C^{(i)}$ is the number of channels in layer i. In such an implementation, the layer-wise feature representations are not directly concatenated along the channel dimension. Rather, prior to concatenation, global average pooling is applied to the second and third dimensions to produce representations of size $BC^{(i)}$, reduced from $BH^{(i)}W^{(i)}C^{(i)}$. After the global average pooling, the feature representations from each layer may be concatenated along the channel dimension, producing the output 420.

As shown in FIG. 4A, the encoder 400 also inputs the initial image data 132 into the salience manager 146 to produce salience data 152, i.e., a saliency map. An example of a saliency map is given by the following expression:

$$S_{I,i} = \sum_{j=1}^{J} w_{ij} |I_j - I_i|$$

where $I_j$ represents a brightness of the $j^{th}$ pixel of the initial image data 132, $w_{ij}$ is a weight, $S_{I,i}$ represents the salience of the initial image data 132 at the $i^{th}$ pixel, and the initial image data 132 has J pixels. It should be understood that there are other representations of a saliency map and that the above expression is an example. The encoder 400 then performs a concatenation operation on the object mask data 134 and the salience data 152 to produce concatenated input for the encoding network 412. This input allows the encoding network 412 to focus on the foreground region of the image and provides information about what is already salient in the image. The encoding network 412 produces the output 422 from the concatenated input.

After the output 420 and output 422 have been generated, the encoder 420 combines the outputs 420 and 422 to produce a combined output 424. As shown in FIG. 4A, the encoder 400 performs the combination by first performing a global average pooling operation 430 on each of the outputs 420 and 422. As shown in FIG. 4A, the pooling operation is applied to outputs from each layer (e.g., labeled "1," "2," "3," and "4" in FIG. 4A). The output 422 is labeled "5" in FIG. 4A. Average pooling provides global information about the image and the attention map which are useful when predicting global parametric transformations. Once global average pooling 430 has been performed on the outputs 420 and 422, the pooled outputs are concatenated to produce the combined output 424 in the order indicated in FIG. 4A. This order as indicated in FIG. 4A is an example and the improvement is not restricted to such an order. The encoder inputs the combined output 424 into layers of a fully connected network 414. The foreground parameter data 156 (which is denoted $p_f$) and the background parameter data 158 (which is denoted $p_b$) are generated (predicted) by the fully connected network heads 416 and 418, respectively.

Figure 4B:
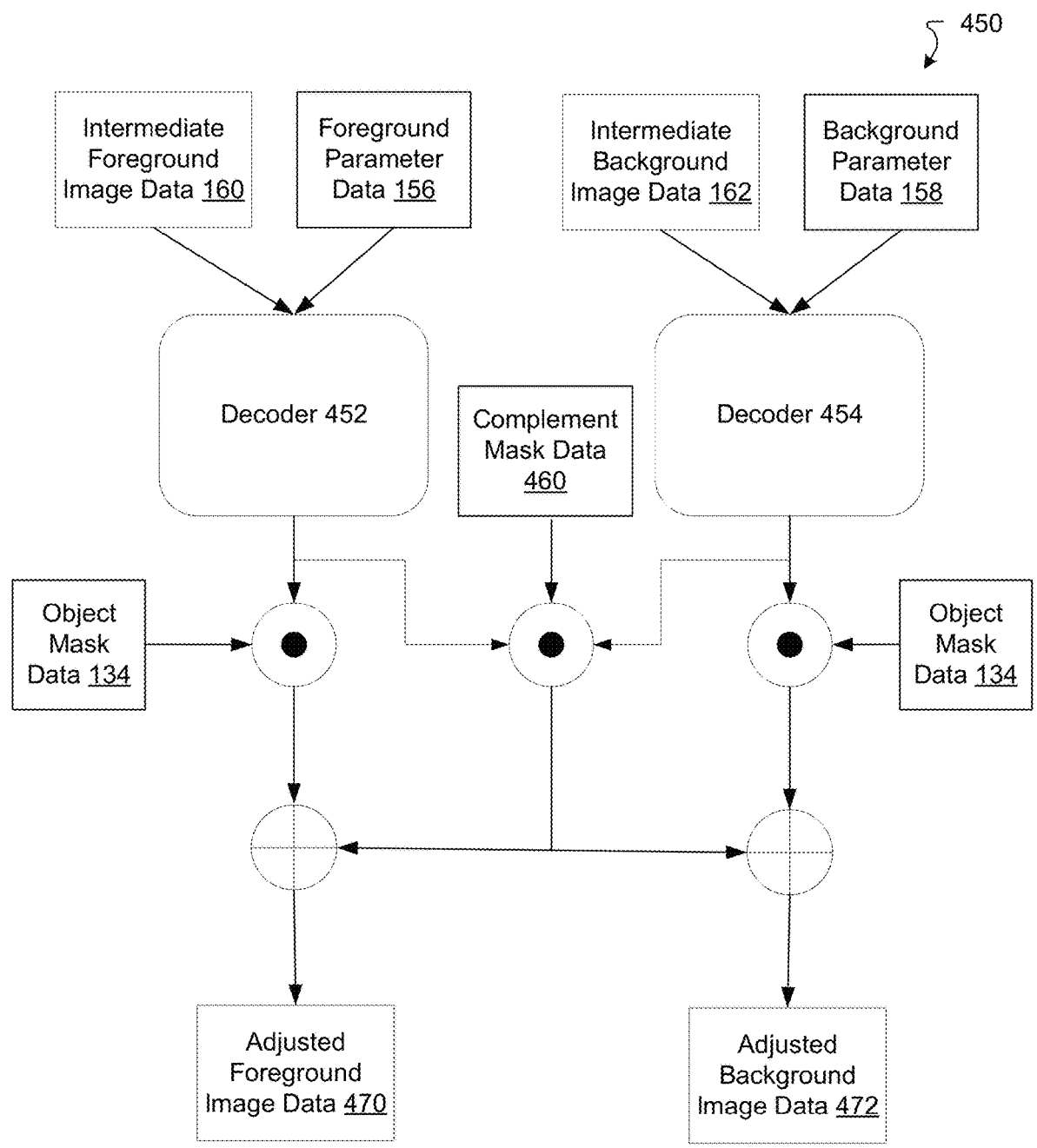
FIG. 4B is a diagram illustrating an example architecture of a decoder.

FIG. 4B is a diagram illustrating an example decoding architecture 450 including decoders 452 and 454. Each decoder 452 and 454 applies the foreground parameter data 156 and the background parameter data 158 to the initial image data 132 to produce the adjusted image data 170. Each decoder 452 and 454 includes a sequence of fixed (i.e., non-trainable), differentiable functions $G_D$ applied separately to the foreground and background regions of the image, demarcated by the object mask m. In some implementations, the sequence of functions is trainable.

In some implementations, given an input image I and a predicted gamma parameter $p_1$, the output image I' is obtained through the differentiable function $I'=I^{p_1}$. In some implementations, the gamma parameter $p_1 \in [0.8, 1.2]$.

In some implementations, given an input image I and a predicted sharpness parameter $p_2$, the output image I' is obtained by first computing image edges using Sobel filters $f_1$ and $f_2$ as follows. Define $I_{edge}=\sqrt{(I*f_1)^2+(I*f_2)^2}$, where * is the convolution operator. The output image is then obtained through the differentiable function $I'=I+p_2 I_{edge} I$. In some implementations, the Sobel filters take the form $$f_1 = \frac{1}{8}\begin{pmatrix} -1 & 0 & 1 \\ -2 & 0 & 2 \\ -1 & 0 & 1 \end{pmatrix}, f_2 = \frac{1}{8}\begin{pmatrix} -1 & -2 & -1 \\ 0 & 0 & 0 \\ 1 & 2 & 1 \end{pmatrix}.$$

In some implementations, given an input image I and a predicted white balance parameter $p_3$, the output image is obtained through the differentiable function $$I' = p_3 I + (1-p_3) I \frac{0.5}{I_{lum}},$$

where $I_{lum}$ is a vector of size 3 obtained by taking a mean over red, green, and blue (RGB) channels; the division by the vector is performed by an element-wise division. In some implementations, the white balance parameter $P_3 \in [0, 0.5]$.

In some implementations, given an input image I and a predicted exposure parameter $p_4$, the output image is obtained through the differentiable function $I'=I \exp(p_4 \log(2))$. In some implementations, the exposure parameter $P_4 \in [-1,1]$.

In some implementations, given an input image I and a predicted contrast parameter $p_5$, the output image I' is obtained through the differentiable function $I'=(1-p_5)I+p_5 I''$, where $$I'' = \left(\frac{I}{I_{lum}}\right) \sin^2(\pi I_{lum}/2).$$

In some implementations, $I_{lum}$ is obtained by taking a mean over red, green, and blue (RGB) channels. In some implementations, $I_{lum}=0.27R+0.67G+0.06B$, where R, G, and B are the values of the red, green, and blue channels, respectively. In some implementations, the contrast parameter $p_5 \in [-1,1]$.

In some implementations, given an input image I and a predicted saturation parameter $p_6$, the output image I' is obtained through the differentiable function $I'=(1-p_6)I+p_6I''$, where I'' is a conversion function between hue, saturation, and value (HSV), and RGB. In some implementations, the conversion function takes the form HSV to RGB(H,S+0.8(1-S) (0.5-|0.5-V|), V), where H, S, and V are the hue, saturation, and value, respectively. In some implementations, the saturation parameter $p_6 \in [-0.5, 0.5]$.

In some implementations, given an input image I, color and tone adjustments are defined using a monotonic and piecewise continuous curve. Such a curve is represented using L different parameters. For example, for tone adjustment the L different parameters are represented as $p^t=\{p_0^t, p_1^t, \ldots, p_L^t\}$. In this case, the output image I' is obtained through the differentiable function $$I' = \frac{1}{p^t} \sum_{i=0}^{L-1} \text{clip}(LI-i, 0, 1) p_i^t,$$

where $$p^t = \sum_{i=0}^{L} p_i^t.$$

In some implementations, for tone adjustment the same set of L parameters $p_i^t \in [0.5, 2]$ are defined for R, G, and B color channels. In some implementations, for color adjustment, three distinct sets of L parameters $\in [0.9, 1.1]$ are defined for R, G, and B color channels.

In some implementations, a predicted Gaussian blur parameter is a standard deviation for a Gaussian distribution (i.e., normal distribution).

To this effect, within the decoding architecture 450, a pair of intermediate images represented by intermediate foreground image data 160 (denoted by $I_f'$) and intermediate background image data 162 (denoted by $I_b'$) are generated sequentially as follows:

$$I_f'(i+1)=G_D(I_f'(i),p_f) \circ m+G_D(I_b'(i),p_b) \circ (1-m) \quad (1)$$

$$I_b'(i+1)=G_D(I_b'(i),p_b) \circ m+G_D(I_f'(i),p_f) \circ (1-m) \quad (2)$$

where $\circ$ denotes a Hadamard (element-wise) operator, $I_f'(0) = I_b'(0) = I$ and $I_f'$ and $I_b'$ are the final iterations, the adjusted foreground image data 470 and the adjusted background image data 472, respectively. The adjusted image data 170 is generated by blending the adjusted foreground image data 470 and the adjusted background image data 472 as follows:

$$I'=I_f' \circ m+I_b' \circ (1-m) \quad (3)$$

The transformation from initial image data 132 to the adjusted image data 170 is constrained within the encoder 400 according to the following criteria. (i) The adjusted image I' should resemble a real image to avoid trivial, obviously-edited solutions. (ii) The adjusted image I' should remain close to the original image I. (iii) The predicted viewer attention (i.e., salience) in the foreground region defined by m should increase. In some implementations in which it is desired to draw attention away from target features of an image, the salience in the foreground region should decrease. These criteria are addressed through a novel loss function to evaluate the adjusted image data 170.

The loss function that addresses the above criteria has three components, one for each criteria. The criterion (i) is addressed using an adversarial loss component. This loss component is generated using a critic D that differentiates between real and generated images. The critic D is trained adversarially with the encoder $G_E$ using a hinge-GAN-based loss, expressed as follows.

$$L_D(\Theta_D) = -\mathbb{E}_{I,m}(\min(0,-D(I')-1)) - \mathbb{E}_I(\min(0,D(I)-1)),$$

$$L_G(\Theta_G) = -\mathbb{E}_{I,m}(D(I')) \quad (4)$$

where $\Theta_D$ and $\Theta_G$ are the learnable weights of D and $G_E$, respectively.

The criterion (ii) is addressed using a perceptual loss component $L_P$. Here, a VGG16 network is used and the features are extracted from the "conv3" layer. Pairwise differences (L2-loss) between the features extracted from the initial image I and adjusted image I' are ensured. The perceptual loss component is expressed as follows.

$$L_P(I, I') = \frac{1}{K} \|\phi(I) - \phi(I')\|_2^2, \quad (5)$$

where $\phi$ is the feature representation extracted from "conv3" and K its dimensionality.

The criterion (iii) is addressed using a salience loss component $L_S$ evaluated by the deep attention model S. Here, S is used to compute saliency maps $S_I(I,\theta_S)$ and $S_{I'}(I',\theta_S)$ for the input and adjusted images, respectively. The salience loss is expressed as follows.

$$L_S(S_I, S_{I'}, m) = \frac{1}{\sum_{i,j} m_{[ij]}} \sum_{i,j} (S_{I[ij]} m_{[ij]} - S_{I'[ij]} m_{[ij]})^\alpha \quad (6)$$

where $A_{[ij]}$ represents the $(i,j)^{th}$ element of A and $\alpha$ is a number representing an exponent to which the quantity in parentheses is raised. In some implementations, $\alpha=2$. The normalization is by the sum (region area) of the binary mask m, in order to give equal importance to smaller regions compared to larger ones. Note that Eq. (6) is minimized when the final saliency values in $S_{I'} \circ m$ are greater than the ones in $S_I \circ m$ (i.e., the predicted attention values inside the masked region of the final image I' are larger than the corresponding values inside the masked region of the input image I). Minimizing the former loss alone would lead to unrealistic results, but in combination with the adversarial and perceptual losses (Eqs. (4) and (5)), the algorithm tries to redirect the user's attention as much as possible while maintaining the realism of the adjusted image I'. The overall loss to be minimized is as follows:

$$L=\lambda_G(L_G(\Theta_G)+L_D(\Theta_D))+\lambda_P L_P(I,I')+\lambda_S L_S(S_I,S_{I'},m) \quad (7)$$

where $\lambda_G$, $\lambda_P$, and $\lambda_S$ are hyper-parameters controlling the amount of emphasis put on the different objectives (keeping the image realistic, increasing the saliency, not modifying the original image too much). In some implementations, the perceptual loss and/or the adversarial loss is disabled. This can be done by setting their respective hyper-parameters to 0.

FIGS. 4A and 4B describe the core encoder/decoder used herein. Nevertheless, there are extensions to the encoder architecture that provide personalization options for users. The options are described with regard to FIGS. 5-8.

Figure 5:
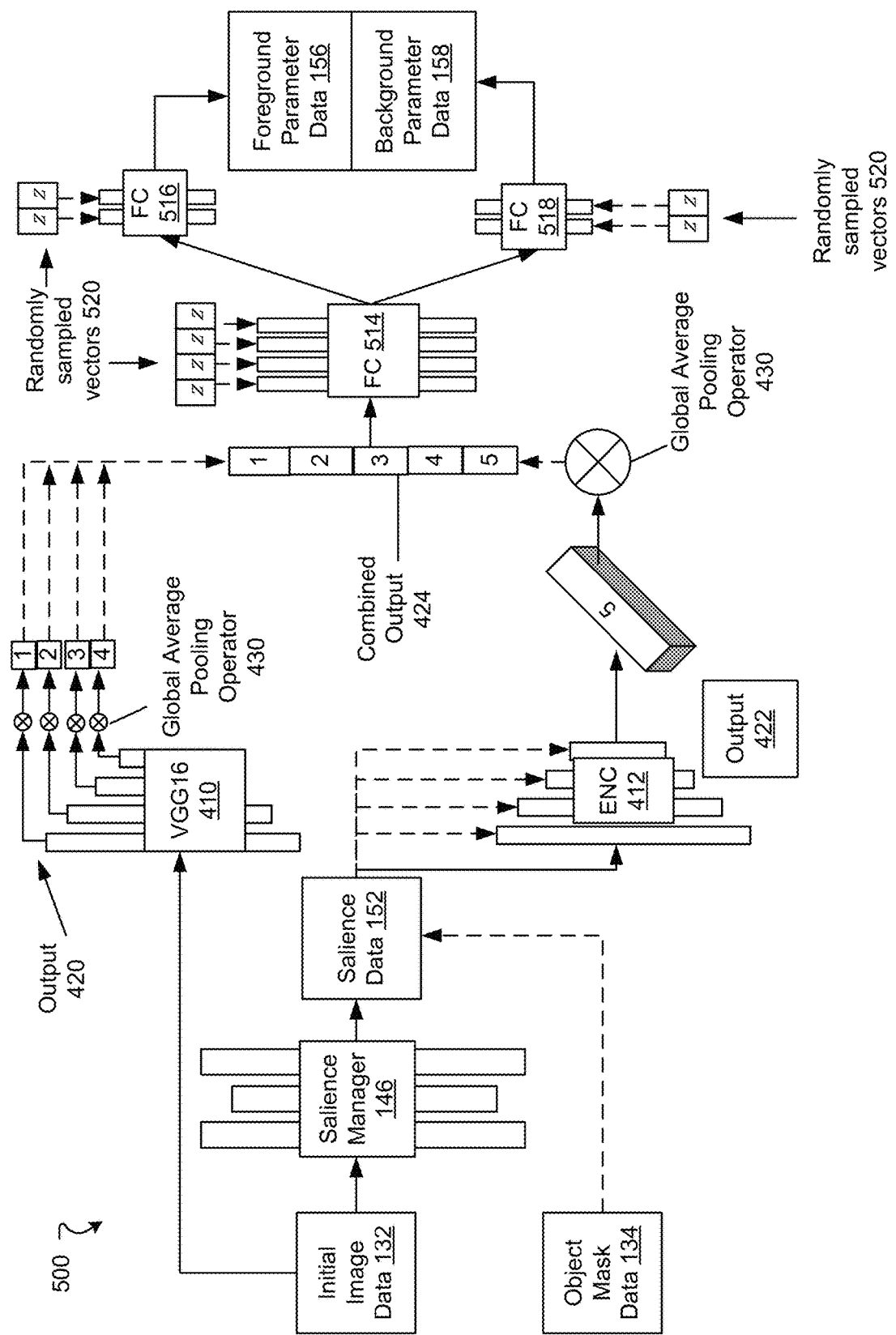
FIG. 5 is a diagram illustrating an example architecture of a CNN-based encoder.

FIG. 5 is a diagram illustrating an example encoder 500 of a CNN-based encoder. The encoder 500 allows a user to disable some image development parameters. In professional software such as Adobe lightroom, users performing image edits are provided with many parameters to adjust via sliders. Depending on the task, image, and user preferences, different sliders might be engaged. A particular user might prefer to use only a subset of the sliders: e.g., they might not want the algorithm to make any modifications to the color features of the image, or they might not want the algorithm to apply blur to an image that contains human faces, etc.

During training, a randomly sampled binary vector 520 $z$ of the same size as the number of parametric transformations is used, where a zero value indicates that the corresponding parameter is disabled and one if it is enabled. The randomly sampled binary vector 520 $z$ is introduced into the decoder 500 $G_E$ by layer-wise concatenation hence allowing the network to know which parameters to use. Then, Eqs. (1) and (2) are modified by disabling the corresponding parameters accordingly:

$$I_f'(i+1) \leftarrow I_f'(i+1)z(i+1) + I_f'(i)(1(i+1))  \quad (8)$$

where if $z(i+1)=0$ then $I_f'(i+1)=I_f'(i)$.

At test time, the user can provide the vector z as an additional input. If the user does not have any experience editing images, they can set the vector z to all ones, and the algorithm will make the best use of all the parameters. On the other hand, more experienced users looking for finer-grained control could select a subset of parameters and set to zero the entries corresponding to the remaining parameters in z.

Figure 6:
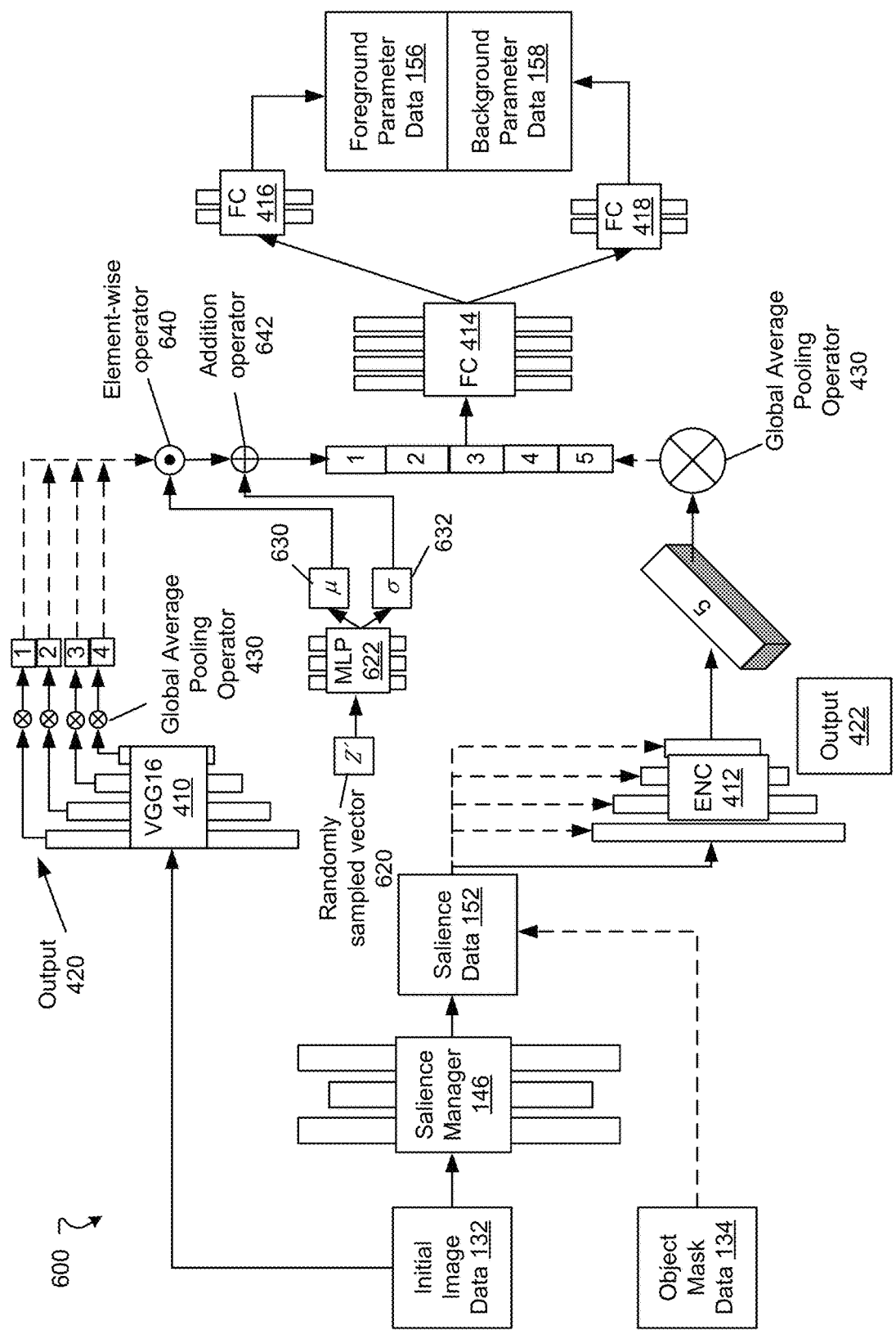
FIG. 6 is a diagram illustrating an example architecture of a CNN-based encoder.

FIG. 6 is a diagram illustrating an example encoder 600 of a CNN-based encoder. The encoder 600 allows a user to automatically define styles, or preferences. Different professionals asked to edit the same image may have different personal styles. The same objective, of emphasizing a particular image region, can be achieved in different ways, using different subsets of parameters. One result might have a darker background, while another might have a blurrier background. This corresponds to differences in 'style'.

Stochasticity can be built into 'styles' by adopting the following training strategy. During training, a randomly sampled vector 610 $\sim \mathcal{N}(0,1)$ is introduced into the network as an input to the network and it is enforced that z' is correlated with the final generated image I'. One way of introducing z' is via layer-wise concatenation, similar to what has been done with z in FIG. 5. However, here a different approach is taken, inspired by the well-established adaptive instance normalization technique, known for its successful applications to style transfer. A similar scheme is proposed using a small multi-layer perceptron MLP 622, the affine transformation parameters 630 $\mu$ and 632 $\sigma$ are generated to modulate (e.g., using an element-wise operator 640 and an addition operator 642) the average-pooled feature representation extracted from the VGG16 network. In that sense, z' is used to modulate the initial feature response of I with the purpose of predicting the appropriate parameters conditioned on z' and leading to a realistic image I'.

Naively using such a noise introduction strategy could lead to a mode collapse when predicting the modulating parameters $\mu$ and $\sigma$. Indeed, predicting $\mu$ as a vector of ones and $\sigma$ as a vector of nulls would result in the identity function when modulating the VGG16 features (i.e., no modulation, no style variation). To avoid the latter, and force the network to generate varied results, an additional loss that aims to reconstruct z' from the predicted parameters $p_f$ and $p_b$ is introduced:

$$L_r(z', \Theta_E) = \frac{1}{n}|z' - E(p)|_1^2  \quad (9)$$

where E is an encoder taking the form of a multi-layer perceptron (MLP) 610 with trainable parameters $\Theta_E$. p is the concatenation of $p_f$ and $p_b$. n is the size of z'. The final loss function, updated from Eq. (7), becomes $$L = \lambda_G(L_G)(\Theta_G) + L_D(\Theta_D) + \lambda_P L_P(I,I') + \lambda_S L_S(S_I, S_{I',m}) + \lambda_r L_r(z', \Theta_E),  \quad (10)$$

where $\lambda_r$ is a hyper-parameter controlling the amount of emphasis put on generating variable style results.

Figure 7:
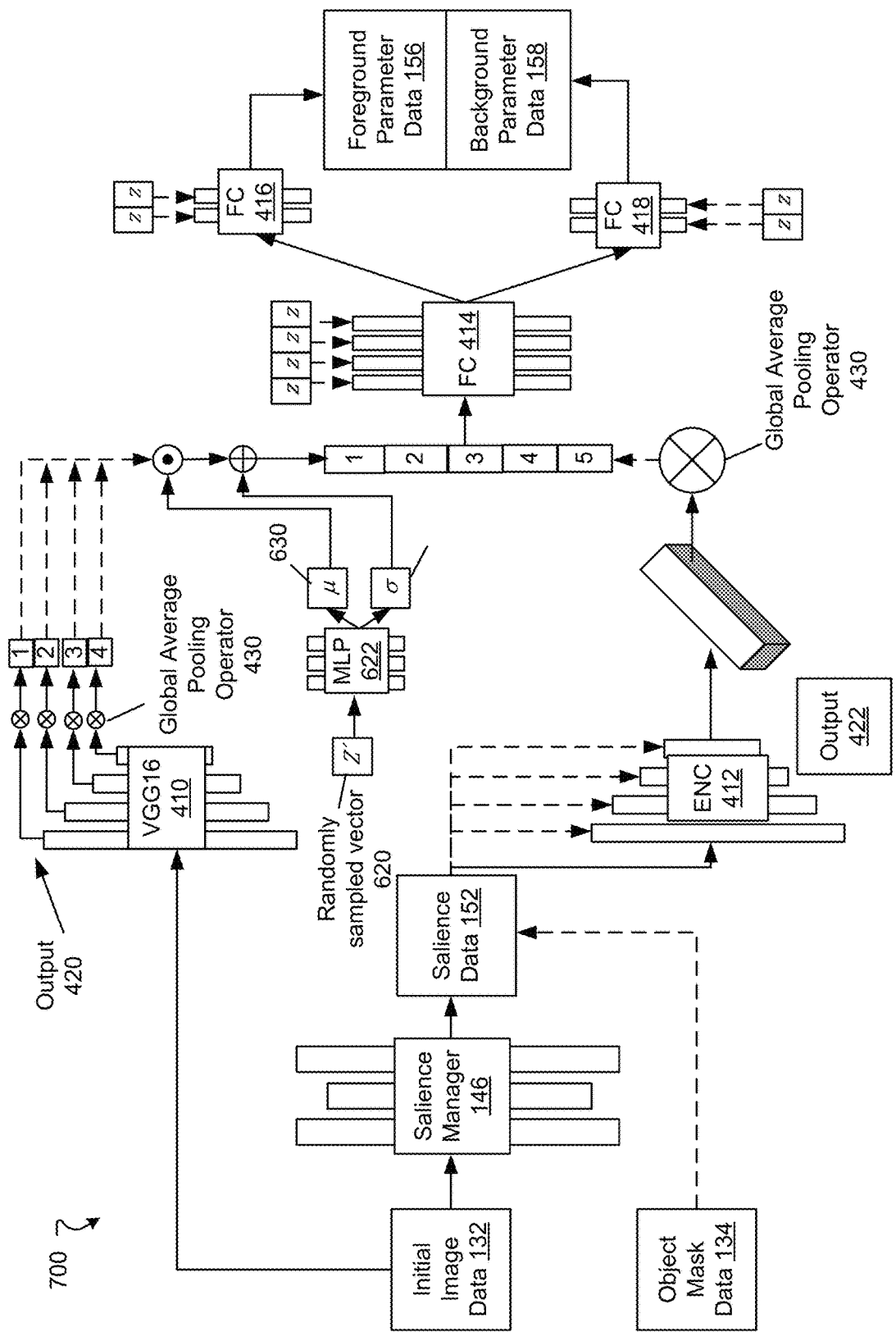
FIG. 7 is a diagram illustrating an example architecture of a CNN-based encoder.

FIG. 7 is a diagram illustrating an example encoder 700 of a CNN-based encoder. The encoder 700 allows a user to combine the parameter control and style control defined with regard to FIGS. 5 and 6, respectively. As such, the resulting network would let a user specify which parameters are "allowed" and have the model sample stochastic variations of the allowed, realistic edits.

Figure 8:
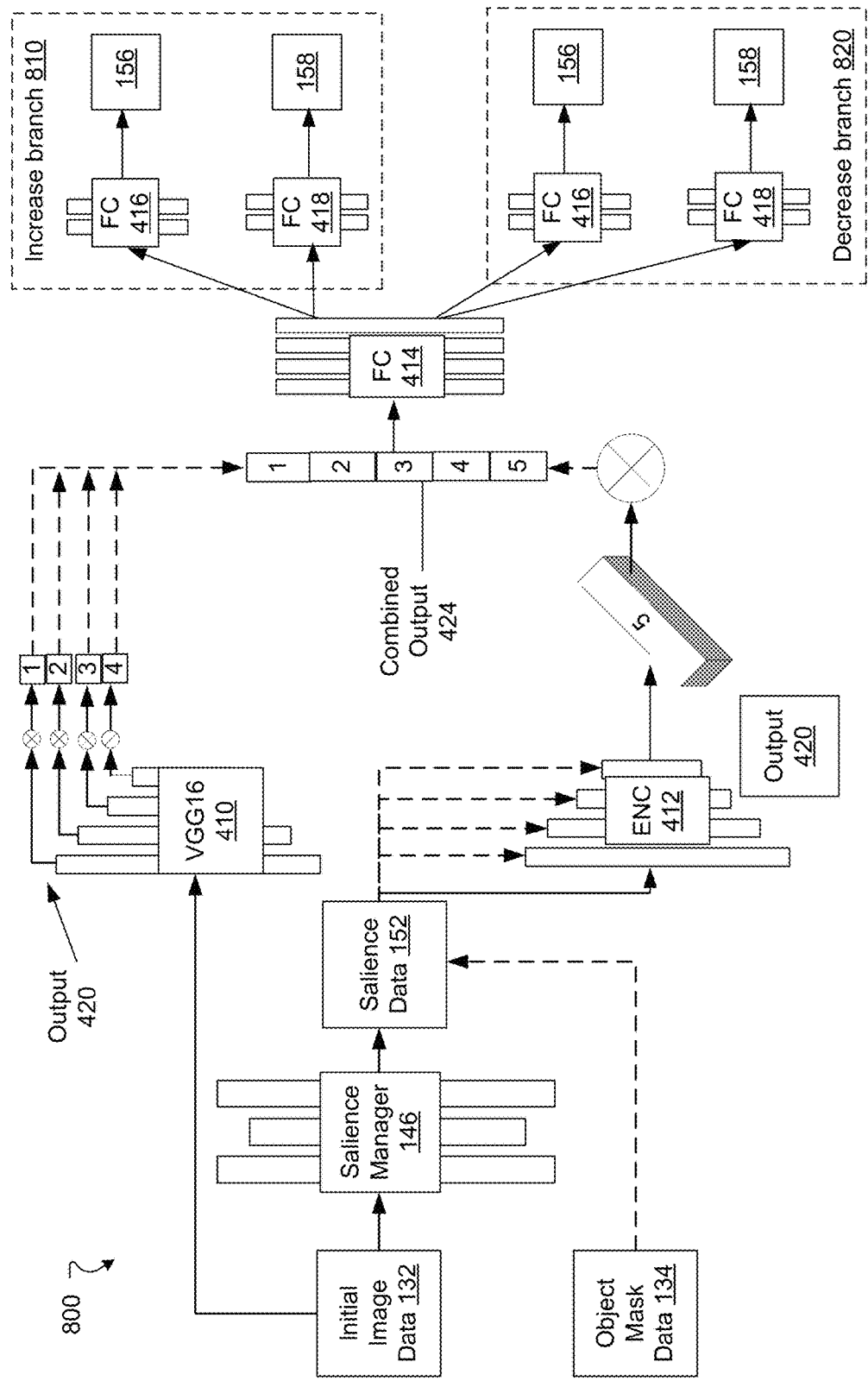
FIG. 8 is a diagram illustrating an example architecture of a CNN-based encoder.

FIG. 8 is a diagram illustrating an example encoder 800 of a CNN-based encoder. The encoder 800 allows a user to both increase and decrease attention in an image region. Decreasing attention in the image is a common task used by photographers in editing photos, for instance, for removing distractors, cleaning portrait shots, or removing extraneous tourists from travel photos and cover art.

The same strategy used to shift the viewer attention towards the image regions specified by the mask m could also be used to shift the user's attention away from the same regions. For this purpose, it suffices to change the sign of $\lambda_S$ to be negative. However, since shifting the attention 'towards' and 'away' from a specific region in the image are related tasks, it is proposed to train on both tasks jointly, instead of separately.

An additional branch specialized for predicting a separate set of parameters $P_f'$ and $p_b'$ is added for this purpose. With this network, an 'increase branch' 810 predicts parameter values used to generate an image I' where viewer attention is increased in the foreground region m, while a 'decrease branch' 820 predicts parameters used to generate 1' where viewer attention is decreased in m. This formulation produces two images from the same set of inputs. In addition, this can be combined with style variants and parameter control, as discussed above with regard to FIG. 7.

Note that at training time, we propose using two separate training sets: one to train the 'increase branch' 810 and one to train the 'decrease branch' 820. The first task requires having images with multiple elements whose saliency can be decreased in order to successfully increase the saliency of a user-specified region (if there is only one main object in the image, little extra can be done). In contrast, training the 'decrease' branch 820 requires discarding images without salient elements, since the model needs to learn to decrease the saliency of particular (salient) image regions. It is proposed to train the shared part of the network using both training sets, while updating the parameters for the 'increase' and 'decrease' branches 810 and 820 separately, using their respective training sets.

The above-described improved techniques, because they predict global parameters to apply to the whole image, can allow the parameters to be predicted on a smaller version of the image and then applied in real-time to a larger higher-resolution version of the same image. This makes the improved techniques especially suitable for professional photography applications. Similarly, parameters can be predicted on a single frame of a video, and then applied in interactive-time to all other frames of the video, provided the main object (to be made more/less salient) is masked out in each of those frames.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving (i) initial image data representing an initial image having a plurality of pixels and (ii) object mask data, the object mask data indicating a foreground region of the plurality of pixels, the object mask data further indicating a background region of the plurality of pixels;
generating (i) foreground image parameter values corresponding to the foreground region and (ii) background image parameter values corresponding to the background region, the foreground image parameter values and the background image parameter values being based on the initial image data and the object mask data, wherein generating the foreground image parameter values and the background image parameter values includes inputting the initial image data and the object mask data into an encoder of a machine learning engine, the encoder including at least one neural network, and the encoder being configured to generate a saliency map of the initial image;
generating adjusted image data representing an adjusted image, the adjusted image being based on the initial image data, the foreground image parameter values, and the background image parameter values, the adjusted image having different salience values in the foreground region than the initial image; and
outputting the adjusted image.

2. The method as in claim 1,
wherein the encoder includes a plurality of neural networks;
wherein generating the foreground image parameter values and the background image parameter values includes outputting the foreground image parameter values and the background image parameter values by a first neural network of the plurality of neural networks, and
wherein generating the adjusted image data includes inputting the initial image data, the foreground image parameter values, and the background image parameter values into a decoder of the machine learning engine, the decoder including a fixed set of functions, each of the fixed set of functions being based on the foreground image parameter values and the background image parameter values and being applied to the initial image data to produce the adjusted image values.

3. The method as in claim 2, wherein generating the foreground image parameter values and the background image parameter values further includes:
inputting the initial image data into a second neural network of the plurality of neural networks to produce a first output indicative of semantic content of the initial image;
generating initial salience data representing a saliency map of the initial image;
inputting the object mask data and the initial salience data into a third neural network of the plurality of neural networks to produce a second output indicative of a difference between the saliency map of the foreground region of the initial image and a saliency map of the foreground region of the adjusted image;
combining the first output and the second output to produce a third output; and
inputting the third output into the neural network of the plurality of neural networks to produce the foreground image parameter values and the background image parameter values upon being input.

4. The method as in claim 3, wherein the first output includes a vector of a specified size, each element of the vector including a representation of a feature extracted from the initial image data.

5. The method as in claim 4, wherein the representation of a feature included in an element of the vector has a size based on a layer of the second neural network from which the representation of the feature is extracted.

6. The method as in claim 3, further comprising performing a global average pooling operation on the first output.

7. The method as in claim 3, further comprising performing a global average pooling operation on the second output.

8. A system configured to adjust a salience of selected regions of images, the system comprising:
at least one memory including instructions; and
at least one processor that is operably coupled to the at least one memory and that is arranged and configured to execute instructions that, when executed, cause the at least one processor to implement an application, the application comprising:
a graphical user interface (GUI) configured to indicate (i) initial image data representing an initial image having a plurality of pixels and (ii) object mask data indicating a foreground region of the plurality of pixels and a background region of the plurality of pixels, the GUI being displayed in a display device;
a machine learning engine including:
an encoder configured to generate (i) foreground image parameter values corresponding to the foreground region and (ii) background image parameter values corresponding to the background region based on the initial image data and the object mask data;
a decoder configured to generate adjusted image data representing an adjusted image, the adjusted image being based on the initial image data, the foreground image parameter values, and the background image parameter values, the adjusted image having increased salience values in the foreground region; and
a display engine configured to display the adjusted image in an output window of the GUI.

9. The system as in claim 8, wherein the adjusted image data is produced from the initial image data and the object mask data based on a machine learning engine, the machine learning engine including an encoder and a decoder,
the encoder including a plurality of neural networks, a first neural network of the plurality of neural networks outputting the foreground image parameter values and the background image parameter values,
the decoder including a fixed set of functions, each of the fixed set of functions being based on the foreground image parameter values and the background image parameter values and being applied to the initial image data to produce the adjusted image values,
wherein the instructions that, when executed, cause the at least one processor to generate the foreground image parameter values and the background image parameter values further cause the at least one processor to input the initial image data and the object mask data into the encode, and
wherein the instructions that, when executed, cause the at least one processor to generate the adjusted image data further cause the at least one processor to input the initial image data, the foreground image parameter values, and the background image parameter values into the decoder.

10. The system as in claim 9, wherein the first neural network includes fully connected layers.

11. The system as in claim 9, wherein the instructions that, when executed, cause the at least one processor to generate the adjusted image data further cause the at least one processor to:
generate an intermediate foreground image based on (i) the initial image in the foreground region and the foreground image parameter values and (ii) the initial image in the background region and the background image parameter values; and
generate an intermediate background image based on (i) the initial image in the foreground region and the foreground image parameter values and (ii) the initial image in the background region and the background image parameter values.

12. The system as in claim 11, wherein the instructions that, when executed, cause the at least one processor to generate the intermediate foreground image further cause the at least one processor to:
apply the decoder to the initial image in the foreground region and the foreground image parameter values to produce a first output;
apply the decoder to the initial image in the background region and the background image parameter values to produce a second output; and
produce, as the intermediate foreground image, a sum of (i) a Hadamard product of the first output and the object mask data and (ii) a Hadamard product of the second output and a complement of the object mask data.

13. The system as in claim 11, wherein the instructions that, when executed, cause the at least one processor to generate the intermediate background image further cause the at least one processor to:
apply the decoder to the initial image in the foreground region and the foreground image parameter values to produce a first output;
apply the decoder to the initial image in the background region and the background image parameter values to produce a second output; and
produce, as the intermediate background image, a sum of (i) a Hadamard product of the first output and the object mask data and (ii) a Hadamard product of the second output and a complement of the object mask data.

14. The system as in claim 11, wherein the intermediate foreground image is a first intermediate foreground image and the intermediate background image is a first intermediate background image, and
wherein the adjusted image is a sum of (i) a Hadamard product of a second intermediate foreground image and the object mask data and (ii) a Hadamard product of a second intermediate background image and a complement of the object mask data, each of the second intermediate foreground image and the second intermediate background image being based on the first intermediate foreground image, the first intermediate background image, the foreground image parameter values, and the background image parameter values.

15. A computer program product including a non-transitory computer-readable storage medium and storing executable code that, when executed by at least one data processing apparatus configured to adjust a salience of selected regions of images, is configured to cause the at least one data processing apparatus to perform a method, the method comprising:
receiving (i) initial image data representing an initial image having a plurality of pixels and (ii) object mask data indicating a foreground region of the plurality of pixels and a background region of the plurality of pixels;
generating (i) foreground image parameter values corresponding to the foreground region and (ii) background image parameter values corresponding to the background region, the foreground image parameter values and the background image parameter values being based on the initial image data and the object mask data, wherein generating the foreground image parameter values and the background image parameter values includes inputting the initial image data and the object mask data into an encoder of a machine learning engine, the encoder including at least one neural network, and the encoder being configured to generate a saliency map of the initial image;

generating adjusted image data representing an adjusted image, the adjusted image being based on the initial image data, the foreground image parameter values, and the background image parameter values, the adjusted image having increased salience values in the foreground region; and displaying the adjusted image on a display device.

16. The computer program product as in claim 15, wherein the adjusted image data is produced from the initial image data and the object mask data based on the machine learning engine, the machine learning engine further including a decoder, the encoder including a plurality of neural networks, a first neural network of the plurality of neural networks outputting the foreground image parameter values and the background image parameter values, the decoder including a fixed set of functions, each of the fixed set of functions being applied separately to the foreground image parameter values and the background image parameter values to produce the adjusted image values, and wherein generating the adjusted image data includes inputting the initial image data, the foreground image parameter values, and the background image parameter values into the decoder.

17. The computer program product as in claim 16, wherein the machine learning engine includes a loss function, the loss function having a salience component and an adversarial component, the salience component of the loss function representing a difference between the salience values of the foreground region of the initial image and salience values of the foreground region of the adjusted image, the adversarial component representing a likelihood that the adjusted image data is recognizable as a real image to a viewer.

18. The computer program product as in claim 17, wherein the loss function further has a perceptual loss component, the perceptual loss component being based on a difference between feature representations extracted from the initial image and the adjusted image.

19. The computer program product as in claim 16, wherein the encoder further includes a control configured to allow a user to enable or disable a parameter of the foreground image parameter values and/or the background image parameter values.

20. The computer program product as in claim 16, wherein generating the foreground image parameter values and the background image parameter values further includes:

inputting the initial image data into a second neural network of the plurality of neural networks to produce a first output indicative of semantic content of the initial image; and wherein the encoder further includes a multi-layer perceptron configured to modulate the first output with a randomly sampled vector having affine transformation parameters, values of the affine transformation parameters indicating a personal style of a user.

\* \* \* \* \*